(12) United States Patent
Kannan et al.

(10) Patent No.: US 8,730,994 B2
(45) Date of Patent: May 20, 2014

(54) FAIR DISCOUNT FOR NETWORK RESOURCE ALLOCATION

(75) Inventors: Ramakrishnan Kannan, Karnataka (IN); Karthik Subbian, Karnataka (IN); Laura Wynter, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 376 days.

(21) Appl. No.: 13/117,455

(22) Filed: May 27, 2011

(65) Prior Publication Data

US 2012/0303816 A1    Nov. 29, 2012

(51) Int. Cl.
*H04L 12/28* (2006.01)
*H04J 1/16* (2006.01)
(52) U.S. Cl.
USPC .................... 370/462; 370/252; 370/329
(58) Field of Classification Search
USPC .......................... 370/252, 462, 329
See application file for complete search history.

(56) References Cited

U.S. PATENT DOCUMENTS

| | | | |
|---|---|---|---|
| 7,711,821 B2 | 5/2010 | Pendarakis et al. | |
| 2010/0125669 A1 | 5/2010 | Esfahany et al. | |
| 2010/0257605 A1 | 10/2010 | McLaughlin et al. | |
| 2010/0299366 A1 | 11/2010 | Stienhans et al. | |
| 2010/0306767 A1 | 12/2010 | Dehaan | |
| 2011/0137805 A1* | 6/2011 | Brookbanks et al. | 705/80 |
| 2013/0325692 A1* | 12/2013 | Chassin et al. | 705/37 |

* cited by examiner

*Primary Examiner* — John Pezzlo
(74) *Attorney, Agent, or Firm* — Scully, Scott, Murphy & Presser PC; Daniel P. Morris, Esq.

(57) ABSTRACT

A method, system and computer program product for allocating network resources. In one embodiment, a service provider allocates an amount of the network resources to a group of clients, and the service provider receives a request from a client for a quantity of the network resources. The service provider negotiates with the group of clients and offers the group of clients an incentive to reduce the amount of the network resources allocated to this group of clients. The service provider reallocates some of the resources from the group of clients, based on this negotiating, to accommodate the request. In this embodiment, each of the group of clients provides a business value representing a value that would be lost due to reductions in the resources allocated to the each client, and the resources are reallocated based on this business values provided by the group of clients.

25 Claims, 7 Drawing Sheets

NEW CLOUD SERVICE FLOW

TYPICAL CLOUD SERVICE WORKFLOW

DERIVING BUSINESS VALUE FROM COMPLEX CONSTRAINTS

FAIR DISCOUNT FOR NETWORK RESOURCE ALLOCATION

BACKGROUND OF THE INVENTION

This invention generally relates to network computing, and more specifically to allocating resources in a network computing environment such as a cloud computing environment.

Cloud computing, which is one type of network computing, refers to a set of hosted resources such as processors, operating systems, software, memory and other components that are made available to users over the Internet or some other network. Using cloud computing, a user or customer can request the instantiation of a virtual machine or set of machines from those resources from a central server or management system to perform intended tasks or applications. The user can lease or subscribe to the requested set of resources on a comparatively short-term basis, such as hours or days, for their intended application.

The paradigm shift from client-server to cloud computing has occurred in the last decade. But only in the last several years, cloud computing has become pragmatic and more affordable to even low-end customers with a monthly budget of a few hundred dollars. The users are not required to know the complications of managing either the resources or the software aspects while deploying a web or business application.

A number of factors have given rise to the increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce disruption due to an application or hardware failure.

A variety of different computing resources may be created on a cloud. For example, a resource may include all the information necessary to run application software, and may include UNIX, Linux, or Windows operating systems and specific application software as desired by a user. The information for configuring the resource to be created is referred to as an image. After an image has been created (instantiated), the resource becomes an instance, such as, for example, a server instance Payment for use of cloud resources is now similar to payment for wireless cell phone plans. The usage is usually billed by a pay-by-use method (like electricity) or by subscription (time based, like a newspaper) with little or no upfront costs. There are many advantages of moving over to cloud computing from traditional client-server architecture, including shared infrastructure costs, no operations or managements costs, and low or no capital expenditure. When software as a service (SaaS) was becoming popular for Web 2.0, Hardware as a service (Haas) was also growing via cloud computing. Clouds are usually run by large high powered data centers, which are interlinked high end servers with very large network bandwidth.

There are many key players in this space of cloud computing including AMAZON®EC2, the RackSpaceCloud®, SAVVIS®, AT&T® Synaptic Hosting, Verizon® CaaS, and IBM® smart business for cloud.

Today a typical user logs on to the website of a service provider, and asks for a resource and required software image for deploying a standard application on the Cloud infrastructure. The user specifies a number of parameters including, and not limited to, the time line during which resources are required, the computing power, and memory. The user also specifies whether it is an immediate (spot-on) request or a future (reserved) request. The prices are determined based on the inputs and the available capacity and a price quote is shown to the user in real time. The user accepts or reject the quote. If the user accepts the quote, then the user submits the job (or uses the resource) at the specified time.

In this operation, the cloud resource receives requests from the cloud users; and based on existing schedule and forecast, the resource provider allocates the resources based on the delivery and resource constraints of the cloud users. With this current approach, in case it is not feasible to provide a user with the requested resources, the resource provider essentially loses that potential revenue and a customer.

BRIEF SUMMARY

Embodiments of the invention provide a method, system and computer program product for allocating network resources in a network computing environment. In one embodiment, a service provider allocates an amount of the network resources to a group of clients, and the service provider receives a request from a client for a quantity of the network resources. The service provider negotiates with the group of clients and offers the group of clients an incentive to reduce the amount of the network resources allocated to this group of clients in order to accommodate the request. The service provider reallocates some of the resources from the group of clients, based on this negotiating, to accommodate the request. In this embodiment, each of the group of clients provides a business value representing a value that would be lost due to reductions in the resources allocated to the each client, and the reallocation of the resources is based on the business values provided by the group of clients.

In an embodiment, resources are reallocated from a minimum number of the group of clients, based on defined criteria, in order to accommodate the request. In an embodiment the defined criteria are provided by the group of clients.

In one embodiment, each of the group of clients provides a resource profile identifying resources allocated to the each client that the each client is willing to give up to another client, and the reallocating is based on the resource profiles provided by the group of clients.

In an embodiment, the resource profile from each client identifies an amount of one of the resources that the each client is willing to accept as a substitute for another one of the resources, to enable a reduction of the another one of the resources allocated to the each client in order to help accommodate the request.

In one embodiment, the request can be accommodated, according to defined criteria, by taking resources from any one of a set of combinations of the group of clients, and a cost is associated with each of these combinations. In an embodiment, the combination of clients is identified that has the lowest of these associated costs, and the resources are reallocated from this identified combination of clients.

In an embodiment, a plurality of ways to reduce the amount of the network resources allocated to the group of clients are identified based on criteria specified by the group of clients and a value is assigned to each of these ways to reduce the amount of the allocated network resources. The one of these ways that has the greatest of these values is used to reduce the amount of the network resources allocated to the group of clients in order to accommodate the request.

In one embodiment, the network computing environment is a cloud computing environment.

The invention, in one embodiment, may be used in a cloud computing environment to accommodate a request for resources that, because of previous allocations, are not available. When the cloud service provider runs out of capacity and cannot accommodate a customer, instead of requesting the cloud user to reconsider his request, the resource provider accommodates the customer's request by negotiating with other current resource users to reduce their resource consumption and offering these other current users an incentive for accommodating the new customer request.

DETAILED DESCRIPTION

Figure 1:
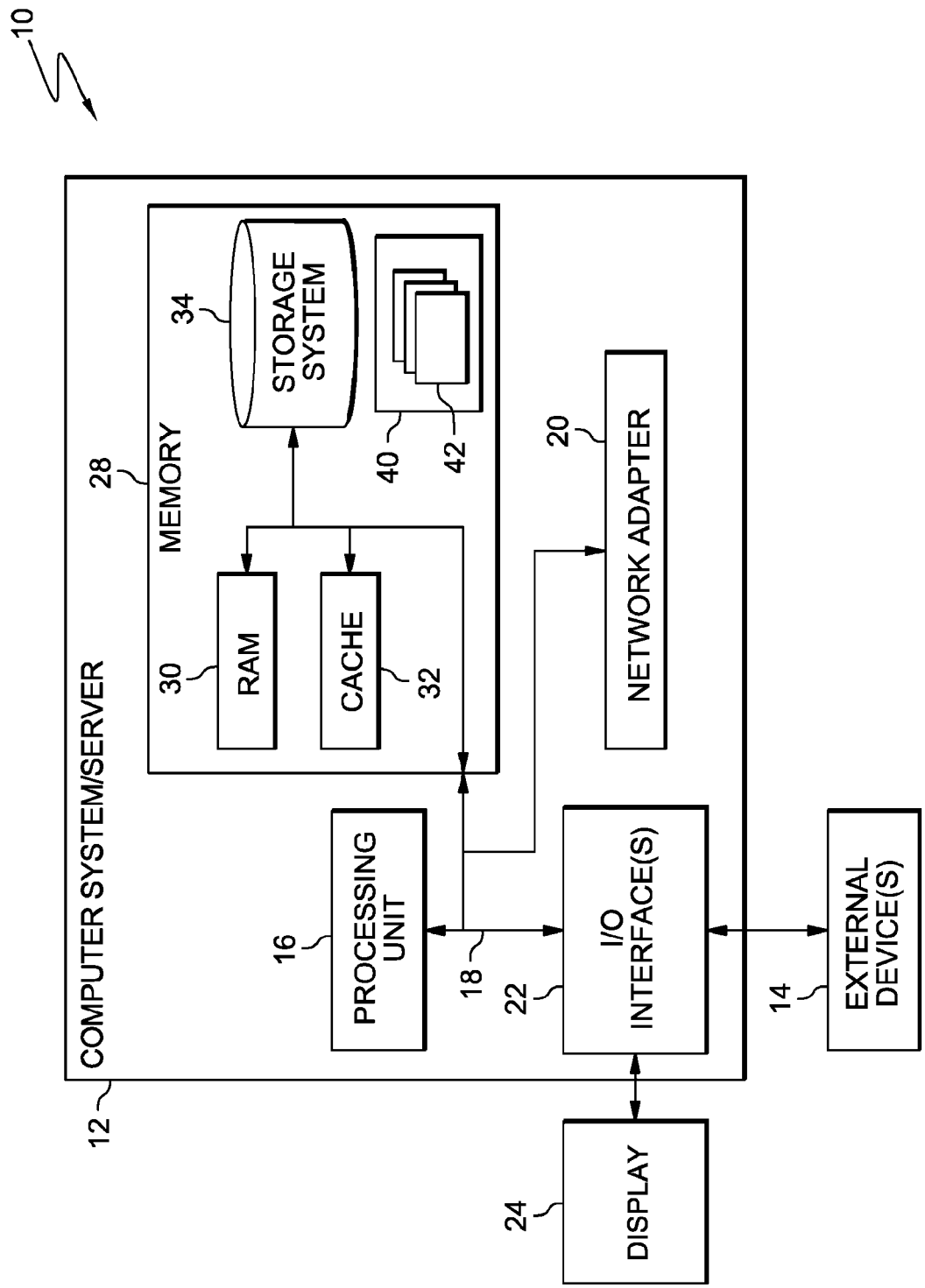
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
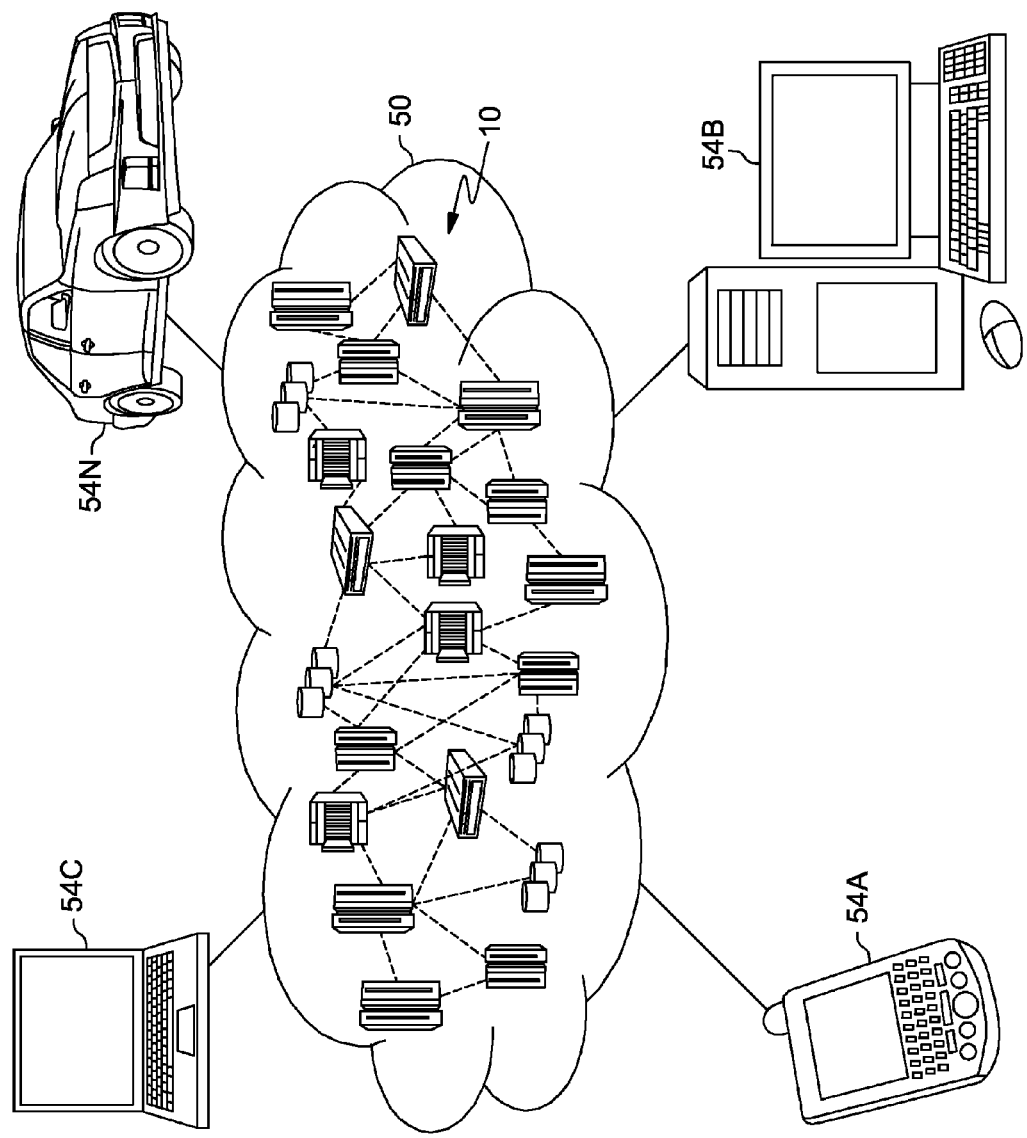
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
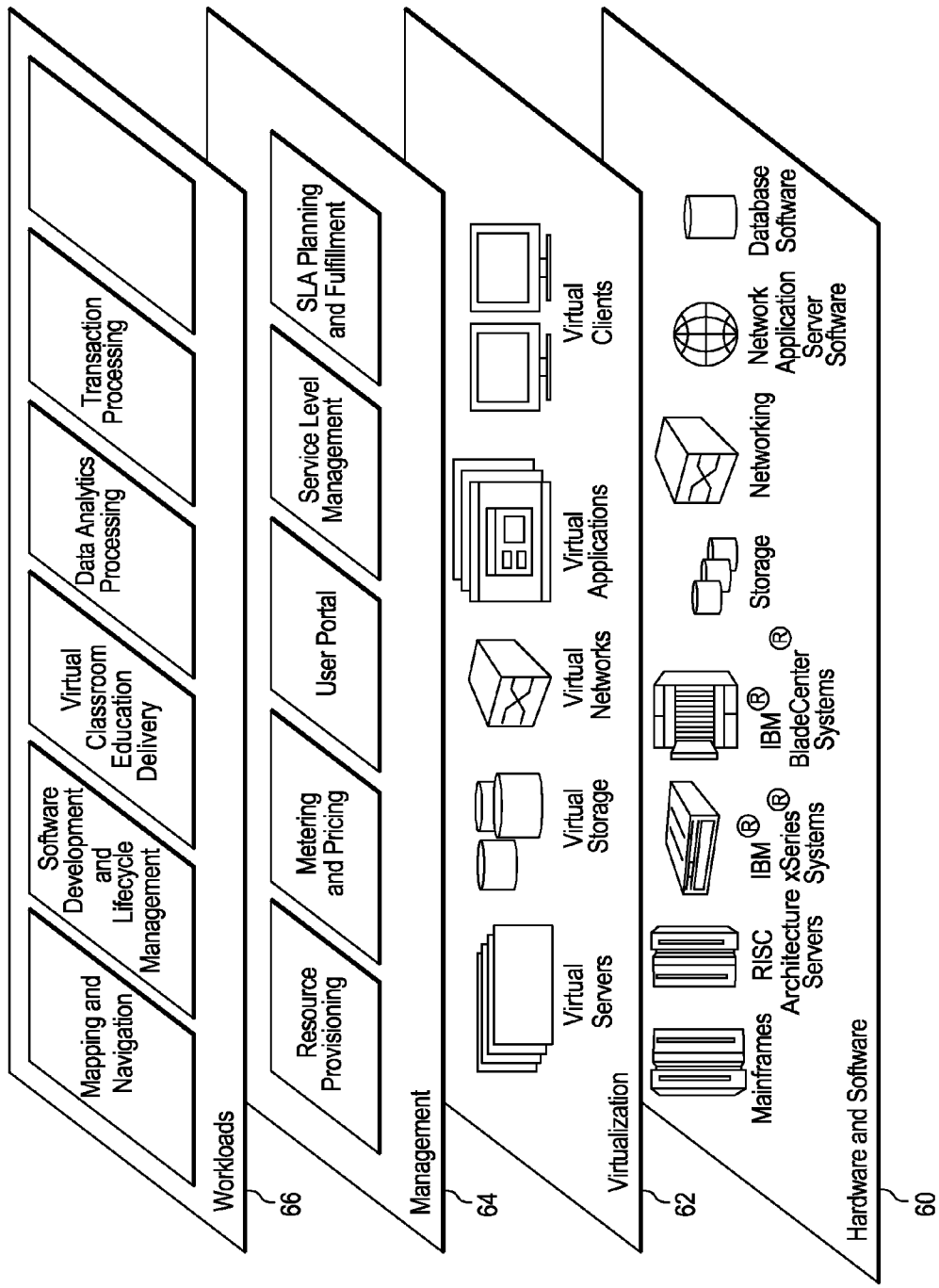
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto.

As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and allocating resources.

Figure 4:
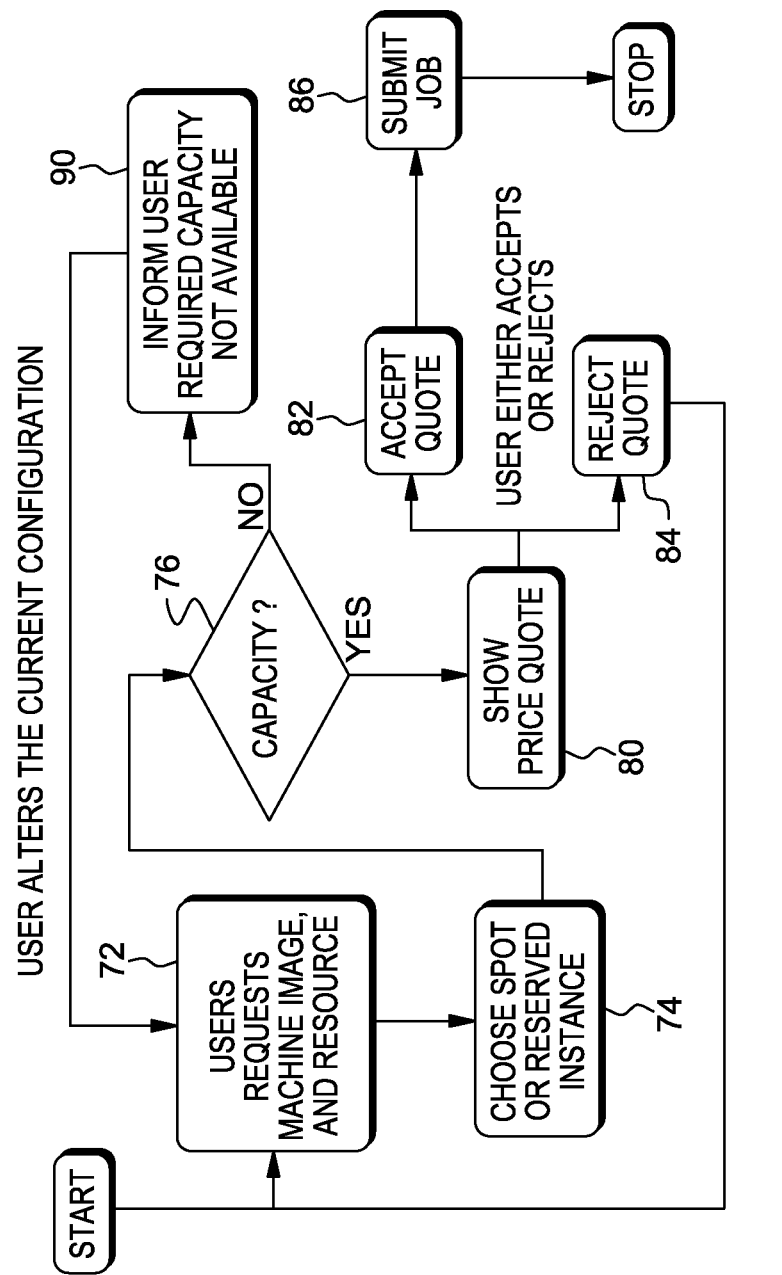
FIG. 4 illustrates a conventional procedure for requesting and allocating cloud resources.

The present invention relates to allocating resources in, for example, a cloud computing environment. FIG. 4 illustrates a conventional manner for requesting cloud resources. In this procedure, a typical user logs on to the website of a service provider, and at 72 asks for a resource and required software image for deploying a standard application on the Cloud infrastructure. The user at 74 specifies a number of parameters including, and not limited to, the time line during which resources are required, the computing power, and memory. The user also specifies whether it is an immediate (spot-on) request or a future (reserved) request. The prices are determined based on the inputs and, at 76, the available capacity and, at 80, a price quote is shown to the user in real time. The user, at 82, accepts or, at 84, rejects the quote. If the user accepts the quote then the user, at 86, submits the job (or uses the resource) at the specified time.

In this operation, the cloud resource receives requests from the cloud users; and based on existing schedule and forecast, the resource provider allocates the resources based on the delivery and resource constraints of the cloud users. With this current approach, in case it is not feasible to provide a user with the requested resources, the resource provider essentially loses that potential revenue and a customer.

Figure 5:
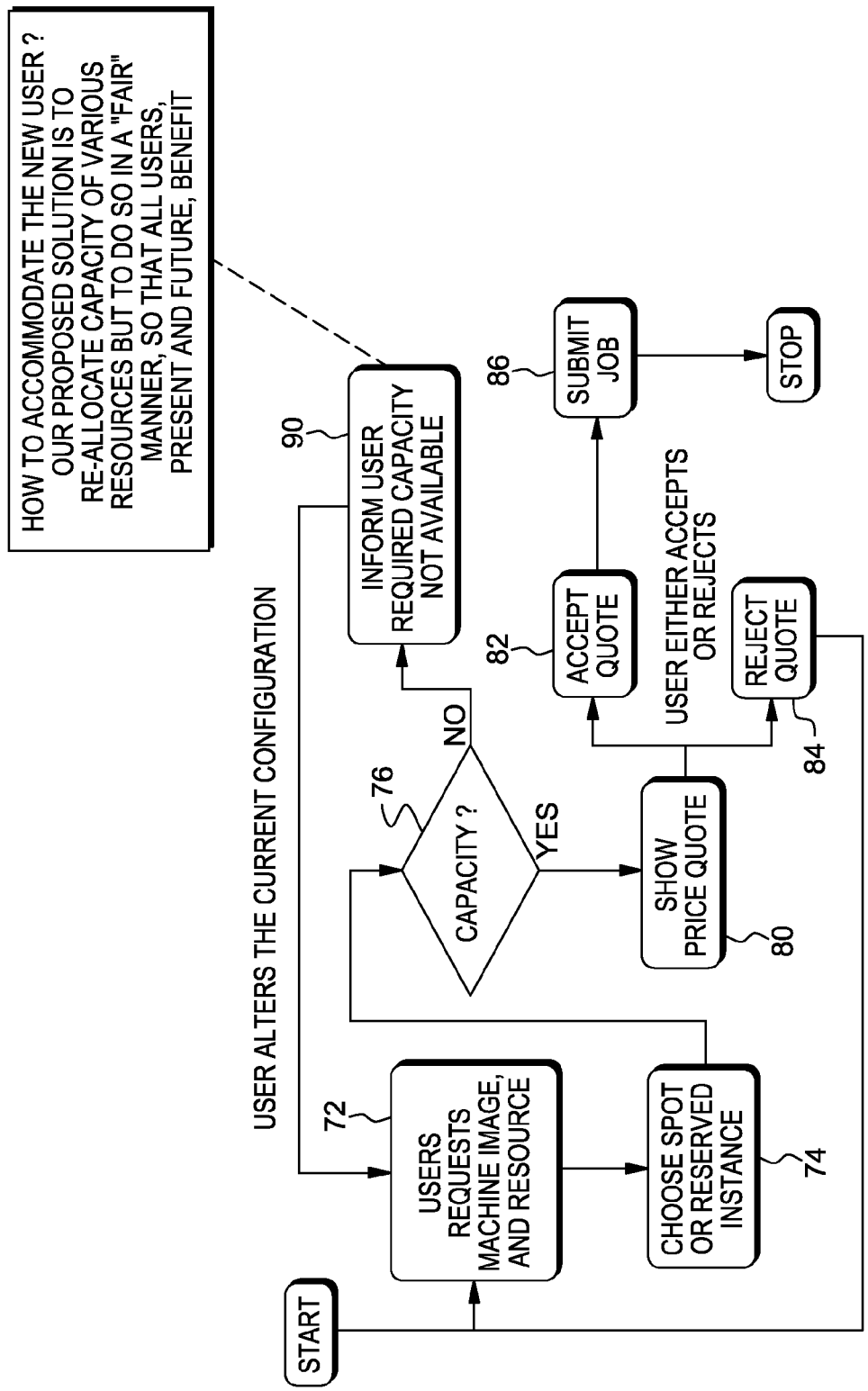
FIG. 5 depicts an alternative, in accordance with an embodiment of this invention, to the procedure of FIG. 4.

The invention, in one embodiment, may be used to accommodate a request for resources that, because of previous allocations, are not available. With reference to FIG. 5, in an embodiment of the invention, when the cloud service provider runs out of capacity and cannot accommodate a customer, instead of requesting the cloud user, at 90, to reconsider his request, the resource provider accommodates the customer's request by negotiating with other current resource users to reduce their resource consumption and offering these other current users a fair incentive (a discount) for accommodating the new customer request.

For example, consider a situation where there are three jobs (job1, job2, job3) currently allocated resources and a new job (job4) arrives with a resource request that cannot be accommodated due to resource constraints. Also assume the following prices set by the provider for this example.

TABLE 1

Resource prices table set by the cloud provider

| Item | Price |
| --- | --- |
| Hard Disk (HD) 10 GB | $1 |
| Memory 1 GB | $2 |
| CPU 1 GHz | $3 |

Following are the resource requirements that are met and allocated by the resource provider.

TABLE 2

Resources consumed by currently allocated Jobs in Cloud

| Job Number | HD Allocated (GB) | Memory Allocated (GB) | CPU Allocated (GHz) | Price Paid |
| --- | --- | --- | --- | --- |
| Job1 | 10 | 1 | 1 | 1 + 2 + 3 = $6 |
| Job2 | 20 | 2 | 2 | 2 + 4 + 6 = $12 |
| Job3 | 30 | 3 | 3 | 3 + 6 + 9 = $18 |

For this example, assume the total resources available with the cloud provider are (100 GB, 9 GB, 9 GHz) for Hard Disk, Memory and CPU respectively. Now, in this example, a new job arrives, say Job4, with (30 GB, 4 GB, 3 GHz) resource requirement. The cloud provider is willing to accommodate this job in the system and Job4 is willing to pay extra (other than the regular price of 3+8+9=$20). Two questions need to be answered: 1. How to deduct extra resources (Memory only, in this example, but usually more complex) from Jobs1, 2 and 3 for meeting the Job 4 requirement? 2. How to share the extra amount that Job4 is willing to pay with Jobs 1, 2 and 3?

The extra amount that Job4 is willing to pay must be at least equal to the sum of the individual losses of the accommodating jobs plus a constant provider fees for such negotiations. In this example, assume the user will provide a business value that is lost due to accommodating some resource reductions, and that the user will provide resource substitution profiles as to what resources can be substituted for what other resource and for how much.

In this example, the resource substitution profile submitted by Job1 is (+1 GB, −0.1 GB, 0 GHz). This means, Job1 is ready to give 0.1 GB memory for 1 GB Hard Disk. There can be many such rules: If memory<9 GB, requires higher bandwidth >1.2 GHZ; if memory <8 GB, requires bw>1.5 GHz; If CPU between 0.8 and 0.9 GB, requires +1.5 GB memory; etc. In this example, consider Job2 rule as (+4 GB, −0.4 GB, 0 GHZ) and the Job3 rule as (+7.5 GB, −0.75 GB, 0 GHZ).

Question 1 can be answered in many ways. For simplicity and to implement at real time, consider the following approach to question 1. Take the maximum amount of resources from the minimum number of players. ILOG JRules can be used to implement this solution by deducting resources, starting from the most resource contributing player to the least resource contributing player.

Question 2 can be answered, for example, using the Shapley Function [Lloyd S. Shapley. "A Value for n-person Games". In Contributions to the Theory of Games, volume II, by H. W. Kuhn and A. W. Tucker, editors. Annals of Mathematical Studies v.28, pp. 307-317. Princeton University Press, 1953] The Profits are divided among the jobs that actually reduced their resources to accommodate the new job using this method.

In this example, the jobs 1, 2 and 3 cannot independently satisfy the additional resource required for Job 4. Hence the valuation of their individual groups is 0. In the two player combinations, only Job2 and Job3 can meet the resource requirement of Job4 by together contributing 2.5 GB and 7.5 GB of hard disk respectively. The business value curve can then be used to find out the amount of metric reduction (response time, or time to computation, etc.) and the corresponding business value impact to each job that contributed to the group. In the case of Job2 and Job3 say the loss in business value is $0.25 and $0.15 respectively for Job2 and Job3, and the total loss for this group is $-0.4. If Job4 pays $2.00 for the resources, the profit for the group by accommodating Job4 is $2.00-$0.4, which is $1.6. This is called the value of the group $\{2, 3\}$. This value is computed for all possible players for whom there is a resource substitution profile and who can form such groups to meet the demand of the new job. If a group cannot meet the demand, then the value of this group is 0. This representation is conventionally referred to as a Transferable Utility (TU) Game Representation, and the Shapley Function provides the fair share amongst the players in the grand coalition (the union of the group of all players who could potentially meet the resource demand of Job4). The TU game representation of this example is depicted below.

$$V(\{1\})=V(\{2\})=v(|3|)=0$$

$$V(\{1,2\})=v(\{1,3\})=0$$

$$V(\{2,3\})=1.6$$

$$V(\{1,2,3\})=1.5$$

The fair division solution for this problem is {0, 50%, 50%} for {Job1, Job2, Job3}, which means Job2 and Job3 get $1 each and Job1 does not get impacted by the resource reduction and does not lose or get any additional money. It is evident from this example that Job2, Job3, Job4 and the cloud provider benefit from this cooperation and Job1 is not hurt by the cooperation.

Figure 6:
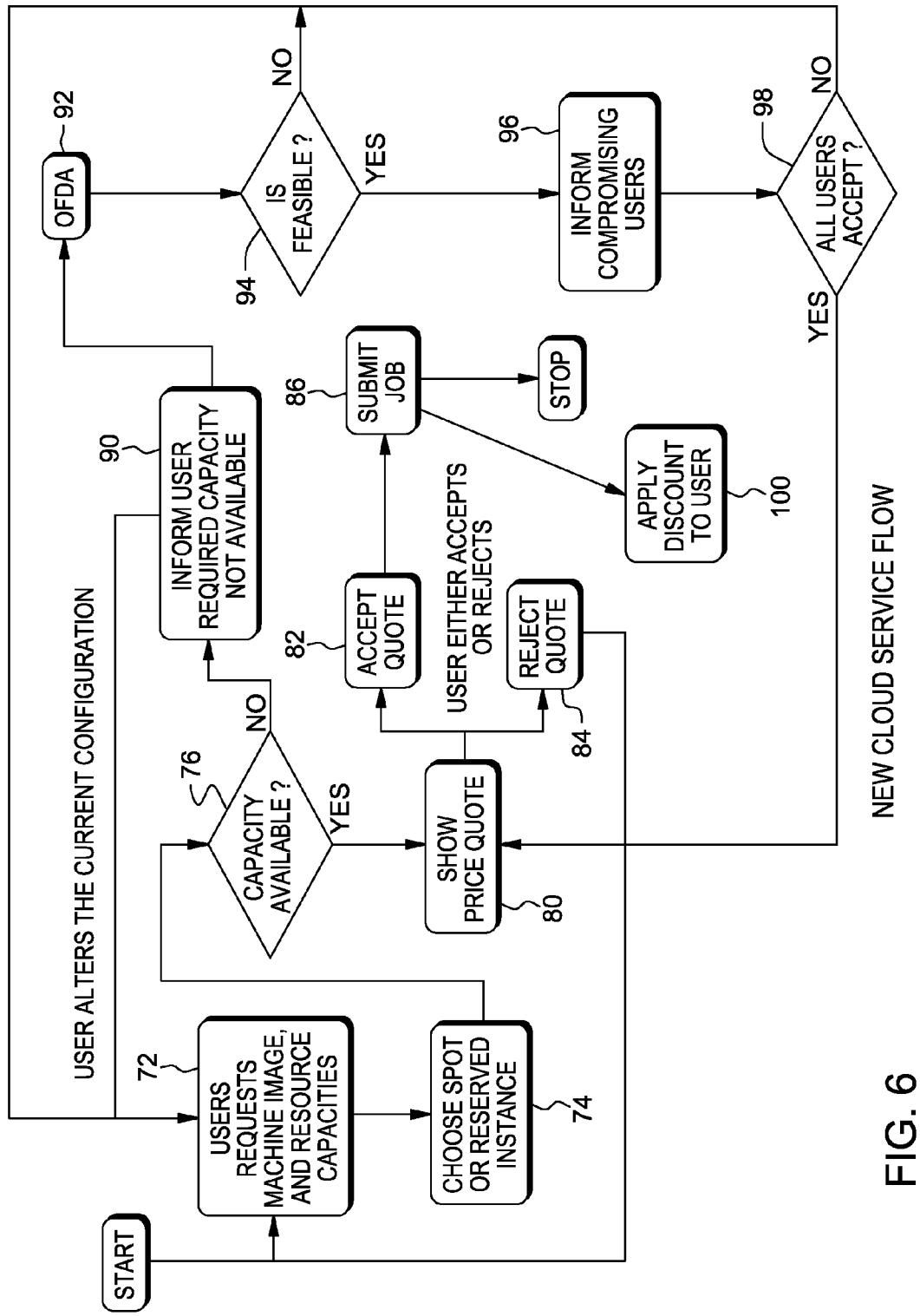
FIG. 6 shows in more detail a method for requesting and allocating cloud resources according to an embodiment of the present invention.

FIG. 6 adds an Online Fair Discount algorithm (OFDA) to the flow shown in FIG. 4. When the resource capacity becomes insufficient for the new job, the OFDA algorithm is invoked. The algorithm, at 94, determines if a solution is feasible. If the algorithm returns no feasible solutions, the user proceeds back to the original flow. Otherwise, the feasible allocation is decided and, at 96, compromising users are informed. If, at 98, the profiles of the comprising users indicate that these users accept automatically, or if these users accept manually, the price quote is shown, at 80, to the new job user. The new user accepts or rejects the quote. If the new user accepts, the profit will be applied to the compromising user's accounts automatically, at 100, by the cloud service provider.

The user inputs that are required actually to solve the problem are discussed below.

Job Requirement Data

Key inputs needed for any job are the minimum and maximum values for each resource required. Start and End times of the job, which imply whether the job is a spot on request or reserve request, are also needed.

Business Value Data

The user has multiple job profiles (Business Application, Web Application, Computational Application, etc.). For each such job profile, the user is provided with a metric slab, for example, a Web application may have the user response time as a metric, and many slabs <1 milli second (ms) to 1 ms, 1 ms to 5 ms, >5 ms (for example). For each such slab, the user specifies the amount of dollars lost in business value. If the user enters abnormal values (say more than 6 standard deviations from default conventional values), the user is informed that he will not be included in the OFDA algorithm.

Figure 7:
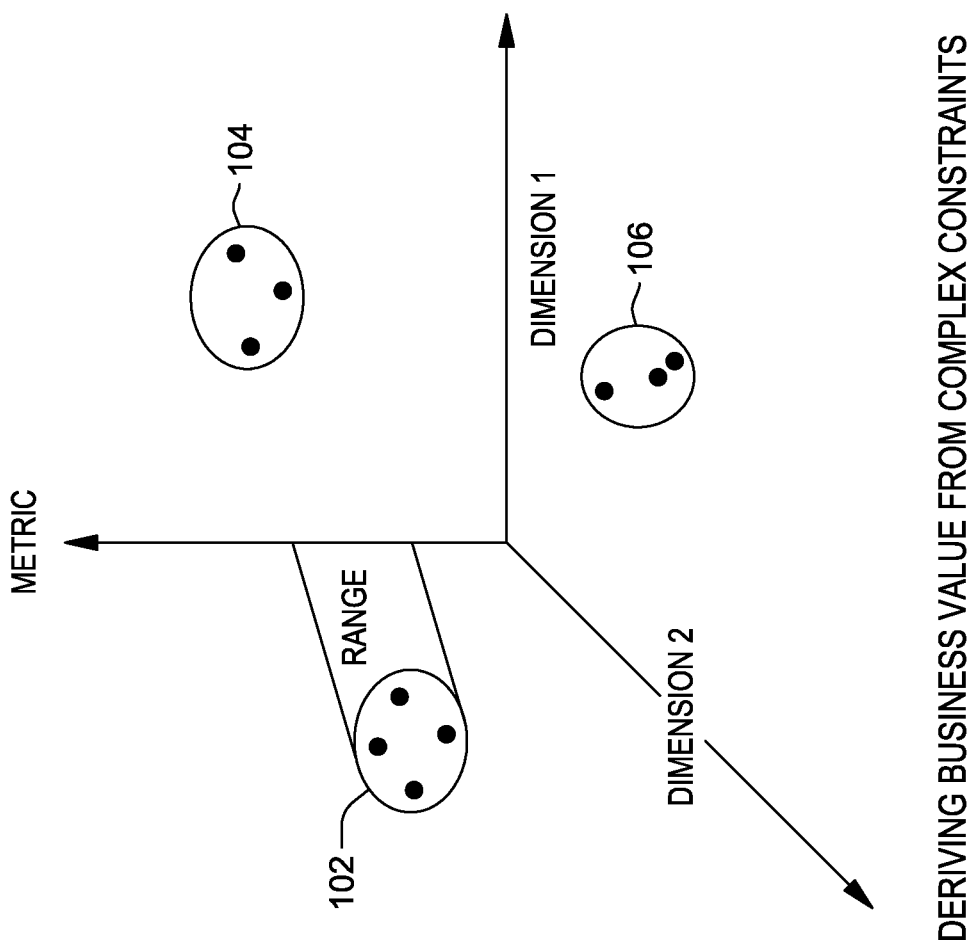
FIG. 7 illustrates deriving business value from complex constraints, which may be used in embodiments of the invention.

The OFDA algorithm requires the business value lost based on the metric affected for each set of resources reduced. Consider FIG. 7, where each point in a multi dimensional space maps a set of resources and the corresponding metric that was achieved historically using this set of resources. These points are clustered, as represented at 102, 104 and 106, and projected onto the metric axis to obtain multiple slabs of metrics (like in the above example, <0.1 ms to 1 ms). For each of these metrics, the user has provided his lost business value in dollars. Given this data, when given a new point in this space, this new point can simply be classified to one of the existing clusters to get the corresponding metric slab and its lost business.

Resource Substitution Profile

The resource substitution profile specifies the amount of a resource that is allowed for substitution to reduce one or more other resources for the job associated with this profile. If the user is not interested in such substitution profiles or in the OFDA, the user may not specify any such substitution profiles. If a user wishes to use a default value, he can choose to do so. If the user wishes to specify explicitly how much to reduce from which type of resource, the user can do so as well.

The Online Fair Discount Algorithm (OFDA)

An embodiment of the OFDA includes the following steps.

1. Find all groups (s) of jobs that are willing to reduce their resources. The set of all such groups is represented as (S).
2. For each such group s,
   a. Obtain the profit that this group may yield after reducing for the business value loss for each user in the group. This profit for group s is represented as V(s).
3. Apply the Shapley Function for V.
4. Normalize the profit shares to get profit share percentages.
5. For each group s, apply the percentages to the overall profit, to get each job's individual profit share.

While it is apparent that embodiments of the invention herein disclosed are well calculated to achieve the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of a service provider allocating network resources in a network computing environment, the method comprising:

the service provider allocating, by a hardware computer system, an amount of the network resources to a group of clients;

the service provider receiving, by the hardware computer system, a request from a client for a quantity of the network resources;

the service provider negotiating, by the hardware computer system, with the group of clients and offering the group of clients an incentive to reduce the amount of the network resources allocated to the group of clients in order to accommodate the request; and the service provider reallocating, by the hardware computer system, some of the resources from the group of clients, based on the negotiating, to accommodate the request; and wherein:

each of the group of clients provides a business value representing a value that would be lost due to reductions in the resources allocated to the each client; and the reallocating is based on the business values provided by the group of clients.

2. The method according to claim 1, wherein the reallocating includes taking resources from a minimum number of the group of clients, based on defined criteria, in order to accommodate the request.

3. The method according to claim 2, wherein the defined criteria are provided by the group of clients.

4. The method according to claim 2, wherein each of the group of clients provides a resource profile identifying resources allocated to the each client that the each client is willing to give up to another client.

5. The method according to claim 4, wherein the reallocating is based on the resource profiles provided by the group of clients.

6. The method according to claim 5, wherein the resource profile from each client identifies an amount of one of the resources that the each client is willing to accept as a substitute for another one of the resources, to enable a reduction of the another one of the resources allocated to the each client in order to help accommodate the request.

7. The method according to claim 1, wherein:

the request can be accommodated, according to defined criteria, by taking resources from any one of a set of combinations of the group of clients; and the negotiating include associating a cost with each combination of the set of combinations.

8. The method according to claim 7, wherein:

the negotiating includes identifying the one combination of the set of combinations that has the lowest cost of the associated costs; and the reallocating includes using the identified one combination to reallocate resources from the group of clients to accommodate the request.

9. The method according to claim 1, wherein the negotiating includes:

identifying a plurality of ways to reduce the amount of the network resources allocated to the group of clients based on criteria specified by the group of clients;

assigning a value to each of the plurality of ways;

identifying the one of the ways having the greatest of the values; and using the identified one of the ways to reduce the amount of the network resources allocated to the group of clients in order to accommodate the request.

10. The method according to claim 1, wherein the network computing environment is a cloud computing environment.

11. A system for allocating network resources in a network computing environment, the system comprising one or more processing units configured for:

allocating an amount of the network resources to a group of clients;

receiving a request from a client for a quantity of the network resources;

negotiating with the group of clients and offering the group of clients an incentive to reduce the amount of the network resources allocated to the group of clients in order to accommodate the request; and reallocating some of the resources from the group of clients, based on the negotiating, to accommodate the request; and wherein:

each of the group of clients provides a business value representing a value that would be lost due to reductions in the resources allocated to the each client; and the reallocating is based on the business values provided by the group of clients.

12. The system according to claim 11, wherein the reallocating includes taking resources from a minimum number of the group of clients, based on defined criteria, in order to accommodate the request.

13. The system according to claim 12, wherein the defined criteria are provided by the group of clients.

14. The system according to claim 12, wherein:

each of the group of clients provides a resource profile identifying resources allocated to the each client that the each client is willing to give up to another client;

the reallocating is based on the resource profiles provided by the group of clients; and the resource profile from each client identifies an amount of one of the resources that the each client is willing to accept as a substitute for another one of the resources, to enable a reduction of the another one of the resources allocated to the each client in order to help accommodate the request.

15. The system according to claim 11, wherein:

the request can be accommodated, according to defined criteria, by taking resources from any one of a set of combinations of the group of clients;

the negotiating include associating a cost with each combination of the set of combinations, and identifying the one combination of the set of combinations that has the lowest cost of the associated costs; and the reallocating includes using the identified one combination to reallocate resources from the group of clients to accommodate the request.

16. An article of manufacture comprising:

at least one tangible computer readable medium having computer readable program code logic to allocate network resources in a network computing environment, the computer readable program code logic, when executing by a processor, performing the following:

allocating an amount of the network resources to a group of clients;

receiving a request from a client for a quantity of the network resources;

negotiating with the group of clients and offering the group of clients an incentive to reduce the amount of the network resources allocated to the group of clients in order to accommodate the request; and reallocating some of the resources from the group of clients, based on the negotiating, to accommodate the request; and wherein:

each of the group of clients provides a business value representing a value that would be lost due to reductions in the resources allocated to the each client; and the reallocating is based on the business values provided by the group of clients.

17. The article of manufacture according to claim 16, wherein the reallocating includes taking resources from a minimum number of the group of clients, based on defined criteria, in order to accommodate the request.

18. The article of manufacture according to claim 17, wherein the defined criteria are given by the group of clients.

19. The article of manufacture according to claim 17, wherein:
- each of the group of clients provides a resource profile identifying resources allocated to the each client that the each client is willing to give up to another client;
- the reallocating is based on the resource profiles provided by the group of clients; and
- the resource profile from each client identifies an amount of one of the resources that the each client is willing to accept as a substitute for another one of the resources, to enable a reduction of the another one of the resources allocated to the each client in order to help accommodate the request.

20. The article of manufacture according to claim 16, wherein:
- the negotiating includes identifying a plurality of ways to reduce the amount of the network resources allocated to the group of clients based on criteria specified by the group of clients, assigning a value to each of the plurality of ways, and identifying the one of the ways having the greatest of the values; and
- the reallocating includes using the identified one of the ways to reduce the amount of the network resources allocated to the group of clients in order to accommodate the request.

21. A method for a service provider to allocate network resources among users in a network computing environment, the method comprising:
- the service provider allocating, by a hardware computer system, a quantity of the network resources to a group of current users;
- the service provider receiving, by the hardware computer system, a new request from a user for some of the network resources;
- the service provider negotiating, by the hardware computer system, with the group of users and offering the group of clients an incentive to reduce the quantity of the network resources allocated to the group of users in order to accommodate the request, including identifying a plurality of ways to reduce the amount of the network resources allocated to the group of current users, and assigning a benefit, based on criteria provided by the group of users, to each of the users, of the group of current users, for each of the plurality of ways; and
- reallocating, by the hardware computer system, some of the network resources from the group of current users, based on the negotiations, to accommodate the new request, including identifying the one of the plurality of ways having the greatest of the benefits to the group of users, and using the identified one of the ways to reduce the amount of the network resources allocated to the group of current users in order to accommodate the new request.

22. The method according to claim 21, wherein:
- each of the group of users provides a resource substitution profile identifying an amount of one of the resources that the each user is willing to accept as a substitute for another one of the resources; and
- the plurality of ways to reduce the amount of the network resources allocated to the group of users are determined using the resource substitution profiles provided by the group of current users.

23. The method according to claim 21, wherein the reallocating includes taking resources from a minimum number of the group of current users, based on defined criteria, in order to accommodate the new request.

24. The method according to claim 21, wherein:
- the new request can be accommodated, according to defined criteria, by taking resources from any one of a set of combinations of the group of current users; and
- the negotiating include assigning a cost to each combination of the set of combinations.

25. The method according to claim 24, wherein the reallocating includes:
- identifying the one combination of the set of combinations that has the lowest cost of the assigned costs; and
- using the identified one combination to reallocate resources from the group of current users to accommodate the request.

* * * * *